US012435709B2

(12) United States Patent
Zachar et al.

(10) Patent No.: US 12,435,709 B2
(45) Date of Patent: Oct. 7, 2025

(54) ELECTROSPRAY EMISSION APPARATUS

(71) Applicant: Accion Systems, Inc., Boston, MA (US)

(72) Inventors: Adam Zachar, Boston, MA (US); Christy Petruczok, Boston, MA (US); William Maulbetsch, Boston, MA (US); Kellen Blake, Boston, MA (US); Carlee Schmidt, Boston, MA (US); Dakota Freeman, Boston, MA (US); Bradley Kaanta, Boston, MA (US); Louis Perna, Boston, MA (US)

(73) Assignee: Accion Systems, Inc., Boston, MA (US)

( * ) Notice: Subject to any disclaimer, the term of this patent is extended or adjusted under 35 U.S.C. 154(b) by 0 days.

(21) Appl. No.: 18/611,296

(22) Filed: Mar. 20, 2024

(65) Prior Publication Data

US 2024/0263623 A1 Aug. 8, 2024

Related U.S. Application Data

(62) Division of application No. 17/674,466, filed on Feb. 17, 2022, now Pat. No. 11,965,494.

(60) Provisional application No. 63/283,705, filed on Nov. 29, 2021, provisional application No. 63/150,502, filed on Feb. 17, 2021.

(51) Int. Cl.
*F03H 1/00* (2006.01)

(52) U.S. Cl.
CPC ........... *F03H 1/0043* (2013.01); *F03H 1/005* (2013.01)

(58) Field of Classification Search
CPC ...... F03H 1/0043; F03H 1/005; F03H 1/0056; B05B 5/025; B05B 5/053; B05B 5/0533; H01J 49/165; H01J 49/167; B64G 1/405; F02K 9/44
See application file for complete search history.

(56) References Cited

U.S. PATENT DOCUMENTS

| | | | | |
|---|---|---|---|---|
| 3,744,247 | A | | 7/1973 | Margosian et al. |
| 4,011,719 | A | * | 3/1977 | Banks .................. F03H 1/0043 60/202 |
| 4,328,667 | A | * | 5/1982 | Valentian ................ H01J 27/26 313/328 |
| 4,937,456 | A | | 6/1990 | Grim et al. |
| 6,110,354 | A | | 8/2000 | Saban et al. |

(Continued)

FOREIGN PATENT DOCUMENTS

WO WO-2004057643 A2 * 7/2004 ............ F03H 1/005

OTHER PUBLICATIONS

Holste, K. , et al., "Ion thrusters for electric propulsion: Scientific issues developing a niche technology into a game changer", Rev. Sci. Instrument. 91, 061101 (2020), published Jun. 24, 2020.

(Continued)

*Primary Examiner* — Loren C Edwards
(74) *Attorney, Agent, or Firm* — Jeffrey Schox; Randy Mehlenbacher

(57) ABSTRACT

An electrospray emitter can include an emitter structure connected to a reservoir containing a working material in electrical communication with a first electrode and an electrode separated from an apex of the emitter structure by a distance, wherein a surface of the grid electrode proximal the emitter structure comprises at least one coating.

14 Claims, 6 Drawing Sheets

(56) References Cited

U.S. PATENT DOCUMENTS

| | | | |
|---|---|---|---|
| 6,404,115 B1 | 6/2002 | Sanderson | |
| 6,878,932 B1 | 4/2005 | Kroska | |
| 9,770,724 B2 * | 9/2017 | Vijay | B08B 3/02 |
| 2009/0056305 A1 * | 3/2009 | Gilchrist | F03H 1/005<br>60/219 |
| 2012/0212120 A1 * | 8/2012 | Holland | H01J 37/08<br>313/306 |
| 2014/0054809 A1 * | 2/2014 | Lozano | H01J 37/08<br>264/28 |
| 2014/0270088 A1 | 9/2014 | Camara et al. | |
| 2015/0338384 A1 * | 11/2015 | Stevens | H01J 49/0422<br>250/424 |
| 2016/0250650 A1 | 9/2016 | Mjay | |
| 2016/0251509 A1 | 9/2016 | Shimoda et al. | |
| 2017/0310123 A1 | 10/2017 | Kano et al. | |
| 2020/0269263 A1 | 8/2020 | Kikuchi et al. | |
| 2020/0373141 A1 | 11/2020 | Perna et al. | |
| 2022/0194633 A1 | 6/2022 | Vasconcelos Da Costa et al. | |

OTHER PUBLICATIONS

Kalantar-Zadeh, Kourourosh , et al., "Low Melting Temperature Liquid Metals and Their Impacts on Physical Chemistry", Acc. Mater. Res. 2021, 2, 577-580.

Kimber, A. , et al., "Dielectric Materials with Deposited Electrode Layers for Electrospray Arrays", AIAA Propulsion and Energy Forum, Jul. 9-11, 2018, Cincinnati, Ohio, 2018 Joint Propulsion Conference.

Ramos, Raul , et al., "Degradation mitigation strategies in electrospray thrusters based on chemically robust thin films", Presented at the 37th International Electric Propulsion Conference, Massachusetts Institute of Technology, Cambridge, MA, USA, Jun. 19-23, 2022.

Thuppul, Anirudh , et al., "Lifetime Considerations for Electrospray Thrusters", Aerospace 2020, 7, 108.

Whittaker, Collin B., et al., "A Resilient Extractor for Electrospray Arrays", Presented at the 37th International Electric Propulsion Conference, Massachusetts Institute of Technology, Cambridge, MA, USA, Jun. 19-23, 2022.

Courtney , et al., "Charge Neutralization and Direct Thrust Measurements from Bipolar Pairs of Ionic Electrospray Thrusters", Journal of Spacecraft and Rockets., vol. 55, No. 1, Jan. 1, 2018 (Jan. 1, 2018), pp. 54-65, XP093214447, US, ISSN: 0022-4650, DOI: 10.2514/1.A33863.

Dandavino , et al., "Microfabricated electrospray emitter arrays with integrated extractor and accelerator electrodes for the propulsion of small spacecraft", Ournal of Micromechanics and Microengineering, Institute of Physics Publishing, Bristol, GB.

Marrese , et al., "A review of field emission cathode technologies for electric propulsion systems and instruments", Aerospace Conference Proceedings, 2000 IEEE Mar. 18-25, 2000, Piscataway, NJ, USA,IEEE.

* cited by examiner

ELECTROSPRAY EMISSION APPARATUS

CROSS-REFERENCE TO RELATED APPLICATIONS

This application is a divisional of U.S. patent application Ser. No. 17/674,466 filed 17 Feb. 2022 which claims the benefit of U.S. Provisional Application No. 63/150,502 filed 17 Feb. 2021 and U.S. Provisional Application No. 63/283,705 filed 29 Nov. 2021, each of which is incorporated in its entirety by this reference.

TECHNICAL FIELD

This invention relates generally to the electrospray emission field, and more specifically to a new and useful system and method in the electrospray emission field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
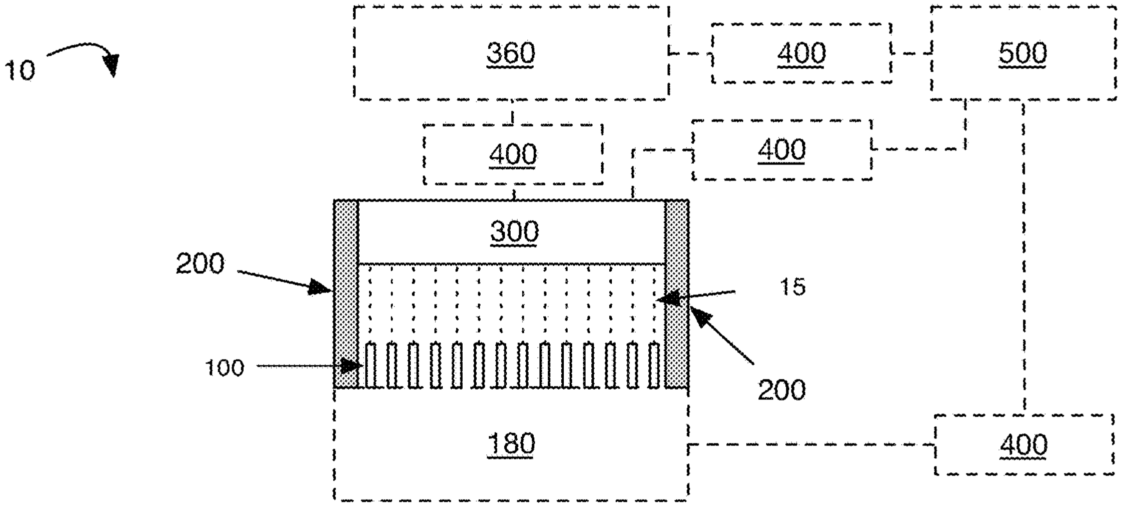
FIG. 1 is a schematic representation of the apparatus.

As shown in FIG. 1, the apparatus 10 can include a frame 200, an electrode 300, and an emitter array 100. The apparatus can optionally include a reservoir 180, one or more secondary electrodes 360, balancing electronics 400, a power supply 500, and/or any suitable components. The emitter array 100 preferably includes a plurality of emitters 150, but can include a single emitter, non-emitting structures, and/or any suitable emitters. Working material is preferably emitted from the emitter array, but any suitable material(s) can be emitted from the emitter array.

The apparatus 10 preferably functions to produce ions (and/or charged droplets) from working material (e.g., working fluid, propellant, etc.), where the ions can be used to generate thrust (e.g., with high efficiency, high thrust density, high specific impulse, etc.) and/or can otherwise be used or analyzed. For example, the apparatus can be mounted to and/or included in a spacecraft (e.g., a satellite such as a CubeSat, U-class spacecraft, picosatellite, nanosatellite, microsatellite, minisatellite, ESPA-class spacecraft, geostationary spacecraft, 1-kg, 10-kg, 50-kg, 100-kg, 500-kg, 1000-kg, 2000-kg, etc.; Space Shuttle; interplanetary probes; extra-solar probes; etc.). However, the apparatus can additionally and/or alternatively be used in biomedical field (e.g., to dose a working material in an injection needle), in electrospray devices (e.g., for electrospray ionization, for electrospray mass spectrometery, etc.), and/or any other suitable field.

2. Benefits

Variations of the technology can confer several benefits and/or advantages.

First, the inventors have discovered that reactions (e.g., chemical reactions, electrical reactions, etc.) between an electrically conductive surface (e.g., an electrode, a frame, etc.) and working material can shorten a lifetime of and/or degrade performance of an electrospray device. For instance, an electrospray device may only operate at a desired performance for a time scale on the order of days, weeks, months, etc.; whereas a desired operation time scale (e.g., attaining a desired performance) is typically longer (e.g., weeks, months, years, decades, etc.). The inventors have discovered that, in some variants of the apparatus, coating electrically conductive surfaces (particularly, but not exclusively, electrically conductive surfaces that incidentally or intentionally contact working material) with a dielectric, manufacturing or forming the surfaces from dielectric materials, and/or otherwise mitigating the impact of incidental contact between working material and a surface can enable an apparatus to have a longer lifetime (e.g., while maintaining at least a threshold performance such as a target impulse, target thrust, target specific impulse, etc.) relative to apparatuses that do not include the dielectric (e.g., dielectric coating) or other mitigation strategies or materials.

Second, variants of the technology can undergo shorting between an emitter array and an electrode, which can lead to degradation and/or failure in other emitter arrays and/or electrodes. Examples of the apparatus can mitigate (e.g., diminish the impact of, plan for, account for, etc.) the effect of this shorting by coupling the electrode to a (shared) ground plane through balancing electronics (e.g., a high impendence resistor).

Third, variants of the apparatus can decrease (e.g., decrease, mitigate, avoid, reduce a probability of, etc.) an impact of (e.g., performance deviation, system instability, efficiency decrease, change in system operation, impact to apparatus lifetime, etc. to one or more electrodes or apparatuses as a whole) a shorting event (such as can occur when working material contacts an electrode with different electric potential) on an electrode. For example, a high impedance resistor between each electrode and a common power supply can reduce the current passed through an electrode during a shorting event. High impedance resistors can provide a technical advantage of passively reducing an effective emission voltage for devices which have higher extractor current than others, thereby balancing the beam-emitted current of devices operating in parallel.

However, variants of the technology can confer any other suitable benefits and/or advantages.

As used herein, “substantially” or other words of approximation (e.g., “about,” “approximately,” etc.) can be within a predetermined error threshold or tolerance of a metric (e.g., a manufacturing tolerance), component, or other reference (e.g., within 0.001%, 0.01%, 0.1%, 1%, 5%, 10%, 20%, 30%, etc. of a reference), or be otherwise interpreted.

3. Apparatus

As shown in FIG. 1, the apparatus 10 can include a frame 200, an electrode 300, and/or an emitter array 100. The apparatus can optionally include a reservoir 180, one or more secondary electrodes 360, balancing electronics 400, a power supply 500, and/or any suitable components. The apparatus 10 preferably functions to produce ions (and/or charged droplets) from working material (e.g., working fluid, propellant, etc.), where the ions can be used to generate thrust (e.g., with high efficiency; with a high thrust density; with a high maximum thrust such as approximately 0.1 mN, 0.5 mN, 1 mN, 5 mN, 10 mN, 50 mN, 100 mN, values or ranges therebetween, >100 mN, etc.; with a low thrust such as less than about 1 mN; with a thrust-to-power ratio such as approximately 1 mN/kW, 10 mN/kW, 25 mN/kW, 50 mN/kW, 75 mN/kW, 100 mN/kW, 200 mN/kW, values or ranges therebetween, <1 mN/kW, >200 mN/kW, etc.; with a high specific impulse; with a high total impulse such as approximately 10 Ns, 50 Ns, 100 Ns, 150 Ns, 200 Ns, 250 Ns, 300 Ns, 350 Ns, 400 Ns, 450 Ns, 500 Ns, 600 Ns, 700 Ns, 750 Ns, 800 Ns, 900 Ns, 1000 Ns, 1100 Ns, 1200 Ns, 1500 Ns, 2000 Ns, values or ranges therebetween, >2000 Ns, etc.; etc.) and/or can otherwise be used or analyzed.

Figure 6A:
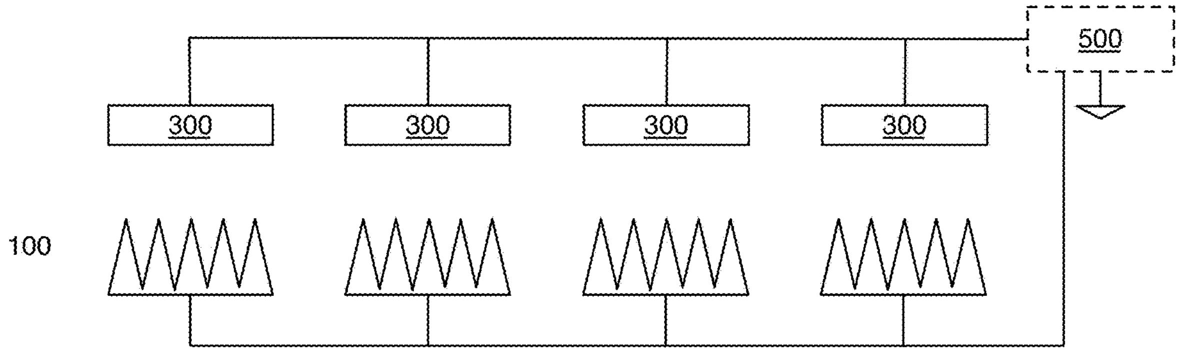
FIGS. 6A and 6B are schematic representations of examples of electrospray emission apparatuses that include a plurality of emitter arrays and electrodes.
Figure 6B:
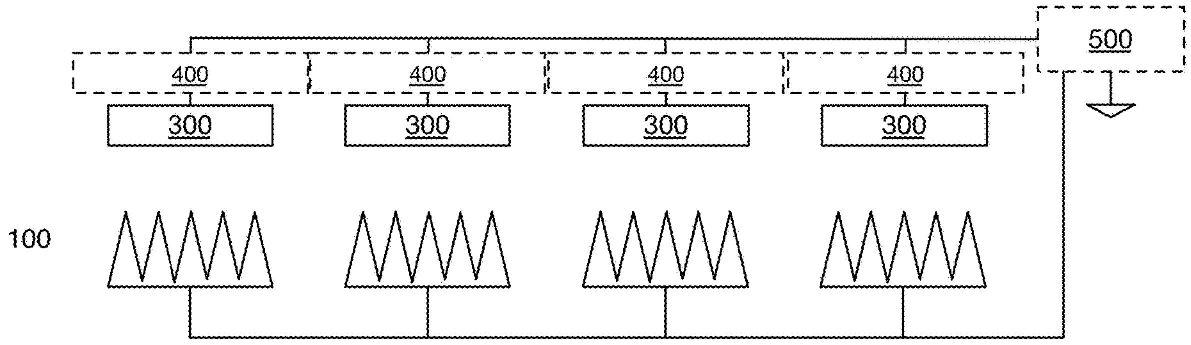
Figure 8:
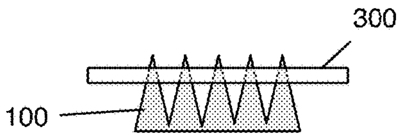
FIG. 8 is a schematic representation of an example of an emitter array where a tip of the emitter array protrudes above an electrode.

The emitter array 100 preferably functions to emit (e.g., eject, release, disperse, etc.) working material. The emitter array preferably includes a plurality of emitters, but can include a single emitter, non-emitting structures, and/or any suitable emitters. The emitter array is preferably in fluid communication with a reservoir 180 (e.g., a reservoir or working material management system as disclosed in U.S. patent application Ser. No. 17/410,157 titled ‘PROPELLANT APPARATUS’ filed on 24 Aug. 2021 which is incorporated in its entirety by this reference; via a manifold, propellant management device, etc.; etc.) and/or other working fluid source, but can be arranged in any manner. The emitter array is preferably aligned to an electrode (e.g., an extractor electrode as shown for example in FIGS. 6A and 6B) such that working material emitted from the emitter array passes through gaps (e.g., openings, spaces, etc.) of the electrode. However, the working material can impinge upon the electrode and/or otherwise exit the emitter array and pass near or through the electrode. The spacing (e.g., separation distance) between the tip of the emitter array (e.g., an emitter of the emitter array, the highest feature of the emitter array, etc.) is preferably between about 0 and 1000 μm (e.g., where 0 μm can refer to an emitter tip that is approximately coincident in height with the lowest point, middle point, highest point, etc. of a plane defined by a surface of the electrode; approximately coplanar with a surface of the electrode near, proximal, etc. the emitter tip, approximately coplanar with a surface of the electrode distal the emitter tip; approximately coplanar with an upstream surface of the electrode; approximately coplanar with an downstream surface of the electrode; coincident with a surface defined by a near-side or a far-side surface of the electrode and the aperture geometry; etc.). In an illustrative example, the separation between the emitter structure and the electrode can be between about 0-100 μm (e.g., 0-50 μm, 10-50 μm, 20-60 μm, 20-75 μm, 0-75 μm, 50-100 μm, 25-100 μm, values or ranges therebetween, etc.). However, the spacing between the tip of the emitter array and the electrode can be less than 0 μm (e.g., as shown for example in FIG. 8, such that a tip of the emitter is at a greater height than the electrode, etc.) and/or greater than 1 mm. In some variants (e.g., for a curved emitter array such as emitters on a curved substrate; for a curved electrode such as an electrode with a concave, convex, serpentine, etc. surface; for emitter arrays that include emitters with varying heights, etc.) different emitters can have different distances relative to the electrode, all emitters can have the same distance to the electrode, the distance between the electrode and the emitter array can vary (e.g., in a predetermined manner, according to a pattern, to achieve a target height distribution, etc.), and/or the emitter array and electrode(s) can have any suitable separation.

The working material 15 preferably functions to provide a solution of ions (e.g., cations, anions) that can be used to generate thrust, but can additionally or alternatively include a material to be analyzed and/or that can perform any other suitable function. The working material is preferably an ionic liquid (e.g., an ionic compound such as an anion bound to a cation that is liquid at temperature T<100° C.). However, additionally or alternatively, the working material can include a monopropellant (e.g., hydroxylammonium nitrate (HAN), ammonium dinitramide (ADN), hydrazinium nitroformate (HNF), ammonium nitrate (AN), hydrazinium nitrate (HN), Advanced Spacecraft Energetic Non-Toxic (ASCENT) propellant, etc. optionally associated with one or more ionic or molecular fuel such as tris(ethano) ammonium nitrate (TEAN), ammonium azide (AA), hydrazinium azide (HA), 2-hydroxyethylhydrazinium nitrate, methanol, ethanol, glycerol, glycine, urea, etc.), a room temperature ionic solid (RTIS), an electrically conductive fluid, a high temperature ionic liquid (e.g., an ionic liquid that is liquid at T>100° C.), and/or any other suitable material. The ionic liquid is preferably imidazolium based (e.g., includes derivatized imidazolium ions such as 1-ethyl-3-methylimidazolium tetrafluoroborate (EMIM-BF4), 1-ethyl-3-methylimidazolium bis(trifluoromethylsulfonyl)imide (EMIM-Tf2N), 1-ethyl-3-methylimidazolium bis(perfluoroethylsulfonyl)imide (EMIM-Beti), etc.); however, any suitable ionic liquid(s) (or class thereof) can be used.

Emitters 150 of the emitter array 100 can be capillary emitters (e.g., an emitter or array thereof as disclosed in U.S. patent application Ser. No. 17/216,425 titled ‘APPARATUS FOR ELECTROSPRAY EMISSION’ filed on 29 Mar. 2021, which is incorporated in its entirety by this reference), porous emitters (e.g., an emitter or array thereof as disclosed in U.S. patent application Ser. No. 16/879,540 titled 'APPARATUS FOR ELECTROSPRAY EMISSION' filed on 20 May 2020 or U.S. patent application Ser. No. 16/511,067 titled 'METHOD AND APPARATUS FOR A POROUS ELECTROSPRAY EMITTER' filed on 15 Jul. 2019, U.S. patent application Ser. No. 16/511,067 titled 'METHOD AND APPARATUS FOR A POROUS ELECTROSPRAY EMITTER' filed 15 Jul. 2019, U.S. Pat. No. 8,791,411 titled 'METHOD AND APPARATUS FOR A POROUS ELECTROSPRAY EMITTER' filed 15 Mar. 2013, U.S. Pat. No. 8,324,593 titled 'METHOD AND APPARATUS FORA POROUS METAL ELECTROSPRAY EMITTER' filed 6 May 2009, U.S. Pat. No. 8,030,621 titled 'FOCUSED ION BEAM FIELD SOURCE' filed 15 Oct. 2008, U.S. Pat. No. 7,863,581 titled 'FOCUSED NEGATIVE ION BEAM FIELD SOURCE' filed 9 Jun. 2008, each of which is incorporated in its entirety by this reference), surface emitters (e.g., guard emitters), non-capillary emitters, and/or any suitable emitters.

In an illustrative example, an emitter array can include a plurality of emitter combs (e.g., where teeth of the comb act as emission sites). In this example, the teeth of a comb (e.g., an apex separation) can be between about 10-1000 μm (e.g., 10, 20, 25, 30, 40, 50, 60, 70, 75, 80, 90, 100, 200, 300, 500, 750, 1000 μm, values or ranges therebetween, etc.) and each comb can be separated by between about 100 and 1000 μm (e.g., 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, 950 μm, 1000 μm, values or ranges therebetween, etc.). A comb length can be between about 1 mm and 100 mm (e.g., 1 mm, 2 mm, 2.5 mm, 3 mm, 4 mm, 5 mm, 6 mm, 7 mm, 7.5 mm, 8 mm, 9 mm, 10 mm, 20 mm, 40 mm, 50 mm, 60 mm, 80 mm, 100 mm, values or ranges therebetween, etc.). An emitter array extent can be between about 1 mm and 100 mm (e.g., 1 mm, 2 mm, 2.5 mm, 3 mm, 4 mm, 5 mm, 6 mm, 7 mm, 7.5 mm, 8 mm, 9 mm, 10 mm, 20 mm, 40 mm, 50 mm, 60 mm, 80 mm, 100 mm, values or ranges therebetween, etc.). In variations of the first specific example, the emission sites can be separated sites (e.g., individual cones, capillary emitters, etc.). In a second specific example, the emitter array can include a hexagonal grid of emitters (e.g., cone emitters, cylindrical emitters, porous emitters, capillary emitters, etc.), where a separation between emitters can be between about 10-1000 μm (e.g., 10, 20, 25, 30, 40, 50, 60, 70, 75, 80, 90, 100, 200, 300, 500, 750, 1000 μm, values or ranges therebetween, etc.).

The apparatus can include a plurality of emitter arrays. Each emitter array can be electrically isolated from other emitter arrays, can be in electric communication with other emitter arrays (e.g., a first subset of emitter arrays or working material associated therewith can be maintained at a first electric potential and a second subset of emitter arrays or working material associated therewith can be maintained at a second electric potential), and/or otherwise have any suitable electrical properties. The emitter arrays can be fed by a common reservoir, sets of emitter arrays can share a reservoir, can each be associated with a reservoir, and/or can otherwise be associated with a reservoir or working material source.

The emitter array (and/or reservoir, manifold, etc.) can include (e.g., be in electrical communication with) an electrode (e.g., a working electrode), which can function to set or maintain an electrical potential of working material within or emitted from the emitter array(s).

The emitter array (and/or working material thereof) is preferably in electrical communication with an electrode (e.g., distal electrode) which functions to maintain the working material at an electric potential. The distal electrode can be arranged within the emitter array, within a reservoir, within a manifold connecting a reservoir to the emitter array (e.g., by including a conductive material such as silicon black or a carbon xerogel in the manifold), and/or can otherwise be arranged. The distal electrode is preferably in electrical communication with a power supply (optionally via balancing electronics). The distal electrode preferably has a large surface area (e.g., a specific surface area that is at least 100 $m^2\ cm^{-3}$, 200 $m^2\ cm^{-3}$, 300 $m^2\ cm^{-3}$, 400 $m^2\ cm^{-3}$, 500 $m^2\ cm^{-3}$, 600 $m^2\ cm^{-3}$, 650 $m^2\ cm^{-3}$, 700 $m^2\ cm^{-3}$, 800 $m^2\ cm^{-3}$, 900 $m^2\ cm^{-3}$, 1000 $m^2\ cm^{-3}$, 2000 $m^2\ cm^{-3}$, 3000 $m^2\ cm^{-3}$, 4000 $m^2\ cm^{-3}$, 5000 $m^2\ cm^{-3}$, 6000 $m^2\ cm^{-3}$, 7000 $m^2\ cm^{-3}$, 8000 $m^2\ cm^{-3}$, 9000 $m^2\ cm^{-3}$, 10000 $m^2\ cm^{-3}$, values therebetween, >10000 $m^2\ cm^{-3}$, etc.; at least 100 $m^2g^{-1}$, 200 $m^2g^{-1}$, 300 $m^2g^{-1}$, 400 $m^2g^{-1}$, 500 $m^2g^{-1}$, 600 $m^2g^{-1}$, 650 $m^2g^{-1}$, 700 $m^2g^{-1}$, 800 $m^2g^{-1}$, 900 $m^2g^{-1}$, 1000 $m^2g^{-1}$, 2000 $m^2g^{-1}$, 3000 $m^2g^{-1}$, 4000 $m^2g^{-1}$, 5000 $m^2g^{-1}$, 6000 $m^2g^{-1}$, 7000 $m^2g^{-1}$, 8000 $m^2g^{-1}$, 9000 $m^2g^{-1}$, 10000 $m^2g^{-1}$, values therebetween, >10000 $m^2g^{-1}$, etc.; etc.), which can help decrease the likelihood of an electrochemical reaction at the distal electrode. However, the distal electrode can have a low surface area (e.g., less than 100 $m^2\ cm^{-3}$, less than 100 $m^2g^{-1}$, etc.; for instance when a high volume or higher mass electrode is used) and/or any suitable surface area.

Figure 9:
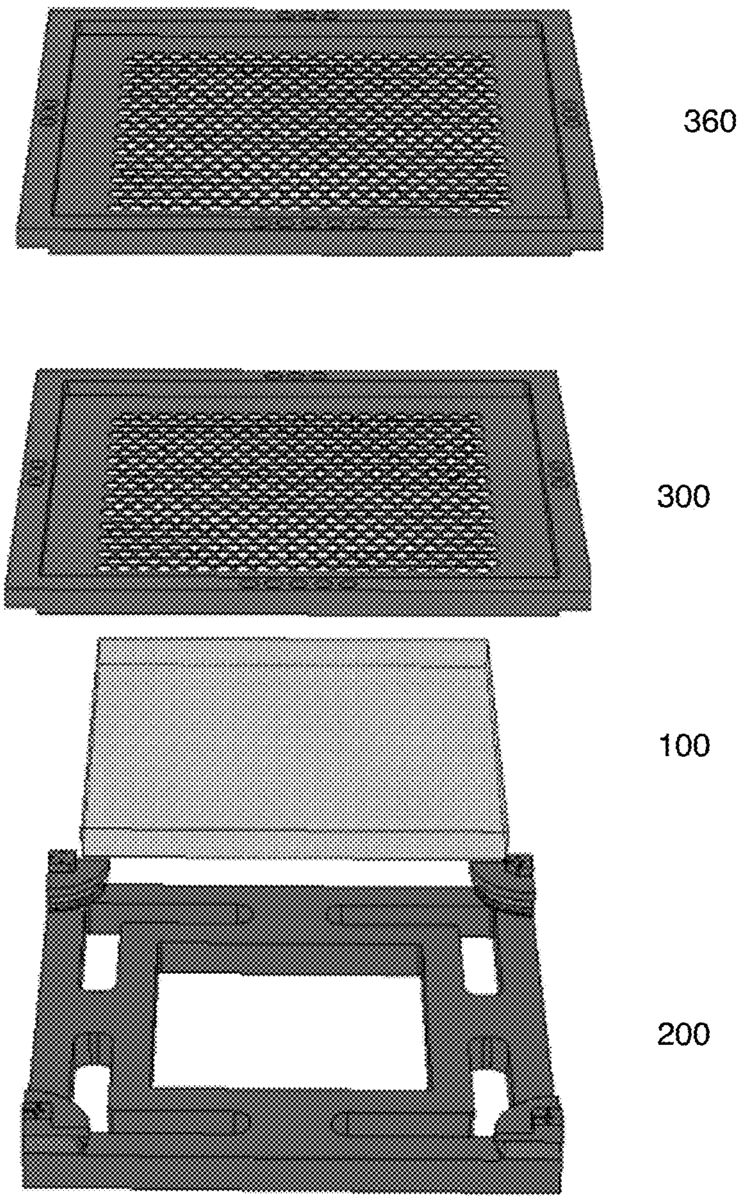
FIG. 9 is a schematic representation of an exploded view of an example of a frame, emitter array, an electrode, and an optional second electrode.

The frame 200 preferably functions to align the emitter array (and/or emitters thereof) to the electrode (e.g., extractor electrode) such as to align emitters (and/or emission of working material therefrom) to openings in the electrode, to provide support for the emitter array and/or electrode, to maintain a separation distance between the emitter array and the electrode, to isolate (e.g., mechanically, electrically, from high energy particles, etc.) the emitter array and/or electrode (e.g., from an external environment), and/or can otherwise function. The frame preferably surrounds the emitter array (as shown for example in FIG. 9), but can be arranged along one or more edges of the emitter array, can intersect the emitter array (e.g., pass between emitters of the emitter array), and/or otherwise be arranged. The frame can be connected to (e.g., adhered, bonded, soldered, fastened, etc.) the emitter array substrate, the electrode, the reservoir, a housing, and/or to any suitable component. However, the frame can additionally or alternatively be free-standing, integrated into one or more component (e.g., form a coextensive structure with the electrode, with the emitter array, etc.), and/or can otherwise be arranged. A separate frame can be associated with each emitter array, each electrode, each set of emitter arrays, each device (e.g., a single frame for all emitter arrays, electrodes, etc.), each set of electrodes (e.g., each set of electrodes operated at a similar electric potential), and/or can include any suitable number of frames associated with any suitable components.

The frame can have a square, rectangle, polygon, circle, oval, elliptical, and/or have any suitable cross-section (e.g., cross-section through a plane perpendicular to a working material emission axis, cross-section for an opening where an emitter array and/or electrode is supported, cross-section through a plane parallel to a working material emission axis, etc.). In a first specific example, a frame can have a square cross-section and support a single emitter array and associated electrode. In a second specific example, a frame can have a rectangular cross-section and support four emitter arrays and four associated electrodes. However, a frame can have any suitable shape and support any suitable number of emitter arrays and/or electrodes.

Figure 2A:
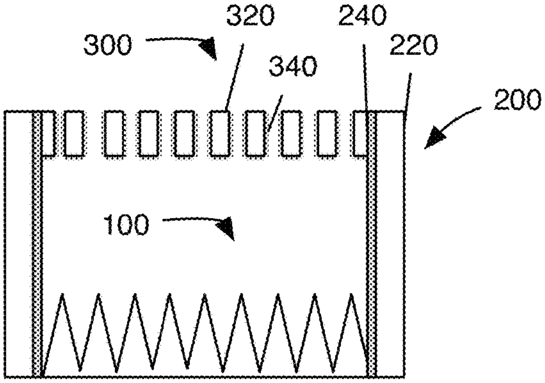
FIGS. 2A-2D are schematic representations of examples of the electrospray emission apparatus.
Figure 2B:
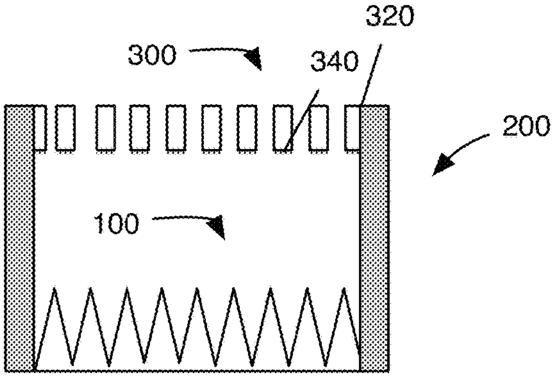
Figure 2C:
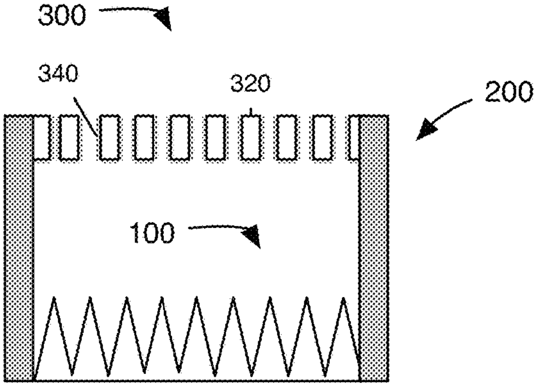

The frame can include (e.g., be made from) electrically conductive materials (e.g., silicon, metals such as gold, alloys, etc.), dielectric materials (e.g., polymers, rubbers, glasses, ceramics, as shown for example in FIG. 2B or 2C, etc.), composite materials (e.g., dielectric composites such as glass composites, resin composites, glass-resin composites, polymer-matrix composites, etc.; conductive composites; internal reinforcements; coated materials; etc.), combinations thereof, and/or include any suitable material(s). Variants of the frame made from dielectrics can be beneficial for limiting a reaction of working material with the frame (e.g., when working material incidentally or intentionally contacts the frame). Variants of the frame made from electrically conductive material can be beneficial for manufacture as the frame can be manufactured using semiconductor fabrication techniques (e.g., lithography, microlithography, etching, etc.).

Figure 2D:
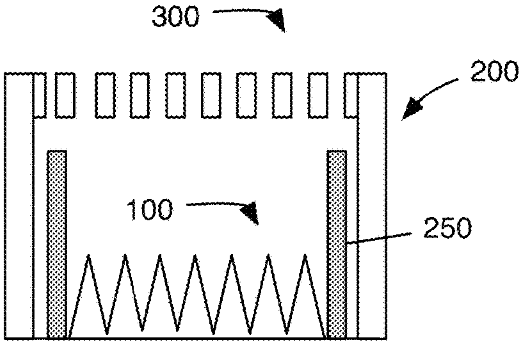

In some variations, as shown for example in FIG. 2D, the frame can include one or more baffles 250, which can function to partially (e.g., along one or more edges, along a portion of the height, etc.) or fully (e.g., the height, the area, etc.) shield or block the frame from working material (e.g., separate, isolate, etc. the frame from incidental or intentional working material exposure). In variants, the baffle can transport (in whole or in part) working material to a benign location (e.g., a reservoir, a nonactive portion of an electrode, etc.), cause working material to be emitted as though through nominal emission (e.g., act as an emitter, guard emitter, etc.), and/or can otherwise remove, destroy, or render the working material inert with respect to performance changes (e.g., degradations) or any other detriment or benefit. The baffle is preferably made of a dielectric material, but can be made of an electrically conductive material (e.g., maintained at an electrical potential that matches the potential of the emitter array or working fluid emitted therefrom) and/or any suitable material. The baffle can extend along the length from the base of the emitter array to the electrode, extend beyond the base of the emitter array, extend beyond the electrode, and/or extend to any suitable subset thereof.

The electrode 300 (e.g., field electrode, ground electrode, extractor electrode, etc.) preferably functions to expose the working material to an electric field (e.g., by having a different electric potential than the working material, working electrode, acting as a ground plane, etc.). However, the electrode can otherwise function. The electrode preferably opposes the emitter array across a gap (e.g., a gap with a separation distance as described above), but can be integrated into the emitter array (e.g., for a portion of an emitter structure) and/or otherwise be arranged. The electrode is preferably connected to the frame, but can be separate from and/or otherwise interfaced with the frame.

Figure 4:
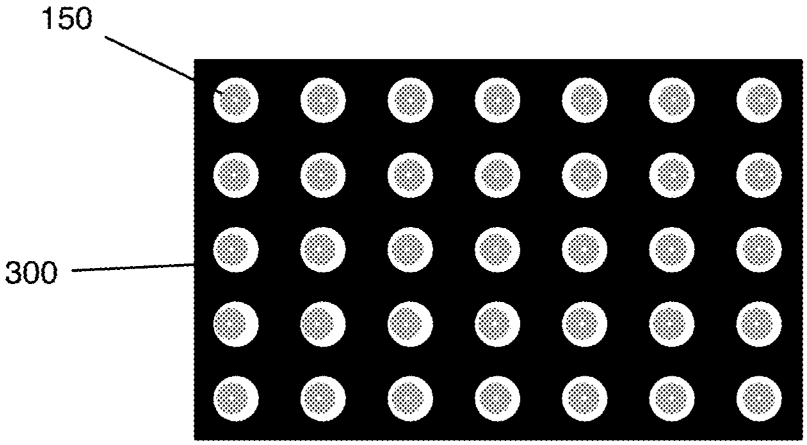
FIG. 4 is a schematic representation of a top-down view of an exemplary grid electrode.

The electrode can be a wire electrode, a grid electrode (e.g., include through-holes arranged on a grid such as a grid matching an emitter array pattern, as shown for example in FIG. 4, bars with a separation between bars, etc.), a bar electrode, and/or have any suitable shape or structure. The size of openings (e.g., locations that working material passes through, apertures) are preferably chosen to balance an amount of working material that impinges upon the electrode (e.g., which can bias the opening to a larger size) with an amount of shielding that the electrode can provide for the emitter to electrons, return ions, charged species, etc. (e.g., which can bias the openings to a smaller size). In an illustrative example, a 350-μm opening can provide approximately a 2× greater shielding than a 400-μm opening (but can also experience an increased impingement of working material). The size of the opening can additionally or alternatively depend on: a target operation, a target lifetime of the apparatus, an emitter pitch (e.g., chosen to match an emitter pitch), and/or can depend on any suitable properties. The size of an emitter opening (e.g., distance between an edge of one bar and a proximal edge of an adjacent bar, radius of the opening, diameter of an opening, linear distance, etc.) can be between about 0 μm and 1000 μm (e.g., 10 μm, 20 μm, 50 μm, 100 μm, 200 μm, 300 μm, 400 μm, 500 μm, 750 μm, 1000 μm, etc.). However, the emitter opening can be greater than 1000 μm.

The apertures preferably match the emitter array (e.g., each emitter is aligned to an aperture). For instance, a plurality of emitters can eject working material through a common aperture and/or each emitter can be aligned to a unique aperture. However, the apertures can otherwise be arranged. In a specific example, rectangular apertures can be aligned to (e.g., arranged above) a comb of emitters. In a second specific example, a hexagonal grid of apertures can be aligned to a hexagonal array of emitters. A spacing between the apertures preferably matches a spacing between emitters (in at least one dimension). For instance, the aperture spacing can be between about 10-1000 μm. However, the apertures can be arranged in any manner and/or have any spacing.

The electrode(s) preferably have a low nominal electrical current (eg., during operation such as when working material is being emitted). In a first specific example, a low nominal electrical current can be 0 A, 1 fA, 5 fA, 10 fA, 50 fA, 100 fA, 500 fA, 1 pA, 5 pA, 10 pA, 50 pA, 100 pA, 500 pA, 1 nA, 5 nA, 10 nA, 50 nA, 100 nA, values or ranges therebetween. In a second specific example, a low nominal electrical current can be a percentage of an emitted ion current (e.g., current of working material emitted) such as <0.001%, 0.001%, 0.002%, 0.005%, 0.01%, 0.02%, 0.05%, 0.1%, 0.2%, 0.5%, 1%, and/or values or ranges therebetween. However, the electrode can have a high nominal electrical current (e.g., where one or more mitigation can offset an impact of a high nominal electrical current on the lifetime of the apparatus; >100 nA; >1% of an emitted ion current; etc.).

The apparatus can include a plurality of electrodes. Each electrode can be electrically isolated from other electrodes (e.g., connected to different power supplies, grounds, etc.), can be in electric communication with other electrodes (e.g., a first subset of electrodes can be connected to a common ground, to a common reference, to a common power supply, to a common power supply output, etc.; and a second subset of electrodes can be connected to a second ground, to a second reference, to a second power supply, to a second power supply output, etc.), can be connected to a power supply, connected to a reference, connected to a ground, and/or otherwise have any suitable electrical connections. Electrodes connected to a common potential source (e.g., power supply, power supply terminal, ground, reference, etc.) are preferably connected in parallel, but can be connected in series.

In some embodiments, the electrode connection to the common potential source (e.g., power supply) can include balancing electronics 400, which can function to reduce an amount of current that passes through an electrode during a shorting event, identify electrodes (e.g., electrode segments, number of electrodes, specific electrodes, etc.) that have experienced a shorting event (e.g., based on a measured current), and/or can otherwise function. These embodiments are particularly beneficial when low nominal extractor currents are used, when an instantaneous performance of different emitter arrays is similar (e.g., differs by less than about 1%, 2%, 5%, 10%, 20%, etc.), and/or can be used in any suitable situations. The balancing electronics can be passive and/or active. The balancing electronics are preferably high impedance resistors (e.g., resistors with an impedance greater than or equal to an impedance of a nominally firing thruster; 100 kΩ, 500 kΩ, 1 MΩ, 5 MΩ, 10 MΩ, 50 MΩ, 100 MΩ, 500 MΩ, 1 GΩ, 10 GΩ, >10 GΩ, values or ranges therebetween, etc.; etc.), but can additionally or alternatively include a low voltage relay (e.g., a field effect transistor switch, solid state relay, reed relay, electromechanical relay, etc.), a diode (e.g., Zener diode), capacitors, inductors, active circuit element (e.g., measure a voltage drop and change the circuit such as modify potential, using a switch, etc. based on the measured voltage drop), a fuse (e.g., a one-time disconnecting switch, fast acting fuse, time delay fuse, progressive fuse, etc.), and/or any suitable electrical components can be used.

A surface of the electrode (particularly but not exclusively a surface of the electrode proximal an emitter array) is preferably substantially flat (e.g., has a surface roughness less than a threshold roughness such as <10 μm, <1 μm, <100 nm, etc.). However, the electrode can have any suitable surface roughness. Features (e.g., particles, structures, corners, etc.) of the electrode preferably have a radius of curvature greater than about 5 μm (e.g., >10 μm, >20 μm, >50 μm, >100 μm, etc.). However, the features can have a radius of curvature that is less than about 5 μm. The radius of curvature can depend on a density of the features, a peak local electrical field generated by features, on an electric potential, a working material, an electrode material, and/or depend on any suitable property of the apparatus or component(s) thereof. As an illustrative example, chemical polishing (e.g., in a heated etchant bath under ultrasonication) can be used to smooth sharp corners and remove (e.g., reduce the number of) irregularities at the scale of 1 to 10 micrometers. In a second illustrative example, annealing can be used to smooth sharp corners (e.g., by heating a material to a temperature near (e.g., within 1° C., 5° C., 10° C., 20° C., 50° C., etc.; to a temperature that depends on a radius of curvature of the sharp features; etc.) a phase transition temperature (e.g., a glass transition temperature, a melting temperature, etc.). However, the features can have any suitable radius of curvature (and/or distribution of radii of curvature).

The electrode can include (e.g., be made of) semiconductors (e.g., silicon), metals (e.g., gold, titanium, chromium, silver, copper, tungsten, etc.), glasses (e.g., a transparent conductive oxide such as indium tin oxide, fluorine doped tin oxide, etc.; semiconducting glass; etc.), polymers (e.g., conductive polymers such as polyacetylene, polyphenylene vinylene, polypyrrole, polythiophene, polyaniline, polyphenylene sulfide, etc.), alloys (e.g., metal alloys), composite materials (e.g., carbon-filled PEEK, carbon filled polyimide, etc.), carbonaceous electrodes (e.g., graphite, graphene, carbon nanotube, graphite oxide, etc.), conductive liquid(s) (e.g., ionic liquids, molten salts, ionic solutions, etc. such as contained within a channel, capillary, between plates, within a cavity, low melting temperature metals, etc.), dry polymer electrolytes, gel electrodes, ceramic electrolytes, organic ionic plastic crystals (e.g., 1,2,4-triazolium perfluorobutanesulfonate, imidazolium methanesulfonate, etc.), and/or other suitable material. The electrode (e.g., electrode materials) preferably has a low yield (e.g., less than about 1%, 2%, 5%, 10%, 20%, etc.) of secondary electron emission or backscatter electron emission, but can have any suitable yield of secondary electron emission or backscattered electron emission.

In some embodiments, an electrode can undergo a process that interrupts (e.g., ceases, prevents, hinders, decreases, etc.) an electrical communication between working material and the electrode (e.g., working material in contact with the electrode such as during a shorting event). Examples of such interruption processes include: thermal fusing (e.g., melting, evaporation, sublimation, into a nonconductive phase, etc. such as when electrical current passes through the electrode), melt and reflow (e.g., to break a connection from nearby thermal events such as arcing), conductive material displacement (e.g., by gas bubble generation due to heating, electrochemistry, etc.), etching, and/or any suitable process.

In a first specific example, an electrode can have a thickness (e.g., be a thin film) such that working material that impinges upon the electrode can etch through the electrode (e.g., to prevent or end shorting that otherwise occurs when the electrode and working material are in contact, act as a degradable electrode, degradable coating, etc.). For instance, the electrode (or conductive material thereof such as a coating as discussed below) can have a thickness between about 10-200 nm (e.g., to ensure a sufficient grain size for electrical properties, a thickness that can be etched through, etc.). However, the electrode can have a greater thickness (e.g., greater than 200 nm) or smaller thickness (e.g., less than about 10 nm). The electrode material preferably does not react with the working material unless an electric current is present (e.g., an electrical current greater than a threshold electrical current such as 1 fA, 5 fA, 10 fA, 50 fA, 100 fA, 500 fA, 1 pA, 5 pA, 10 pA, 50 pA, 100 pA, 500 pA, 1 nA, 5 nA, 10 nA, 50 nA, 100 nA, 500 nA, 1 μA, values or ranges therebetween, <1 pA, >1 μA, etc.), but the electrode material can react with the working material in the absence of an electric current. Exemplary electrode materials that can be used (particularly but not exclusively) in this first specific example include titanium, chrome (e.g., chromium), silicon, boron, iron, bismuth, zinc (e.g., zinc solid, zinc mercury amalgam, etc.), tantalum, nickel, silver (e.g., with a sulfur source), and/or any suitable electrode material can be used.

Figure 11:
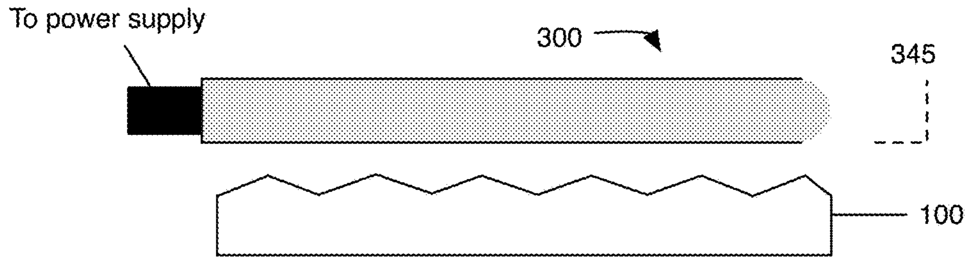
FIG. 11 is a schematic representation of an example of an electrode that includes a liquid conductor.
Figure 12:
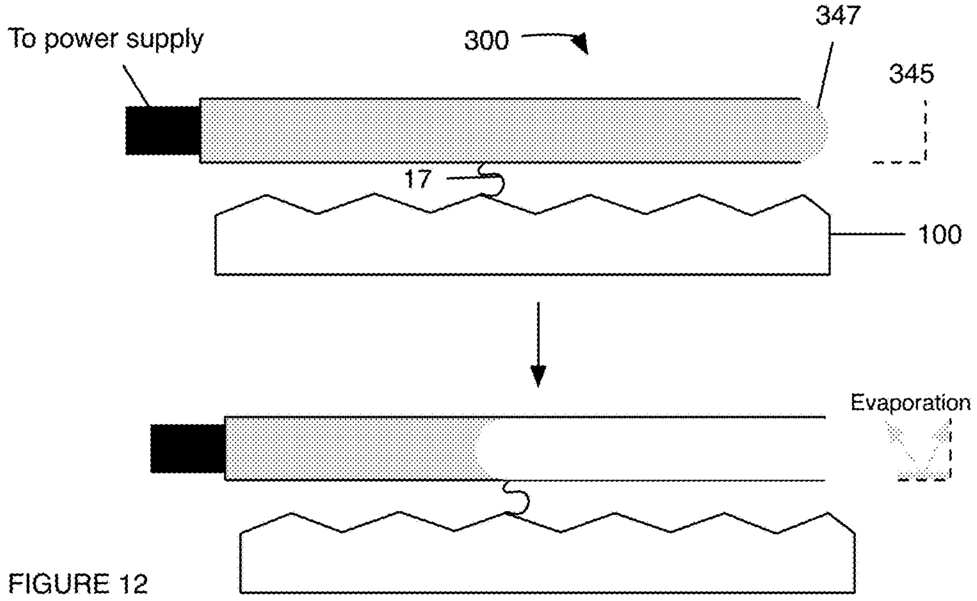
FIG. 12 is a schematic representation of an example of a liquid electrode being disconnected after an electrical short when working material is incident upon the electrode.

In a second specific example (as shown for instance in FIG. 11 or FIG. 12), an electrode can include a liquid conductive medium 347 (e.g., conductive material). In this specific example, when a shorting event 17 (e.g., working material contacts the electrode, electrode surface, etc.) occurs, the conductive material can be vaporized (e.g., proximal the shorting location) and evacuated from the electrode (e.g., breaking an electrical connection proximal the shorting event). In this specific example, the liquid conductive medium can be located within a capillary (e.g., made of thermally conductive material, electrically conductive material, etc.). An end of the capillary is preferably open (e.g., to enable evacuation of conductive material in the event of a shorting event where a baffle 345, blocker, reservoir, etc. can be used to control release of the material), but the capillary can be sealed (e.g., in fluid communication with a reservoir that can expand and contract to evacuate the conductive material during a shorting event, to return conductive material to the capillary when a shorting event ends, etc.) and/or have any suitable configuration. A diameter of the capillary is preferably such that a surface tension of the conductive material opposes evaporation of the conductive material (e.g., in a space environment a meniscus is formed and little or no evaporation occurs). However, the capillary diameter can otherwise be set. Examples of liquid conductive media include: francium, cesium, rubidium, gallium, mercury, alloys (e.g., alloys including one or more of the prior metals), ionic liquids, salt solutions, and/or any suitable materials can be used.

In variations of the second specific example, the electrode can include low melting point, low boiling point, low sublimation point, etc. conductive materials. For instance, indium, thallium, tin, lead, bismuth, alloys, amalgams, conductive polymers (e.g., that can undergo a phase transition to a nonconductive state at or above a threshold temperature), and/or any suitable materials (e.g., metals with a melting point less than a threshold temperature such as 300° C., 350° C., 500° C., etc.) can be used as the conductive material. In these variations, the conductive material can undergo a phase change (e.g., boil, sublime, melt, etc.) when a shorting event occurs (e.g., due to resulting heat generation) and be shuttled away from the shorting location (thereby interrupting, ending, decreasing an amount of electricity channeled, etc.).

Figure 13:
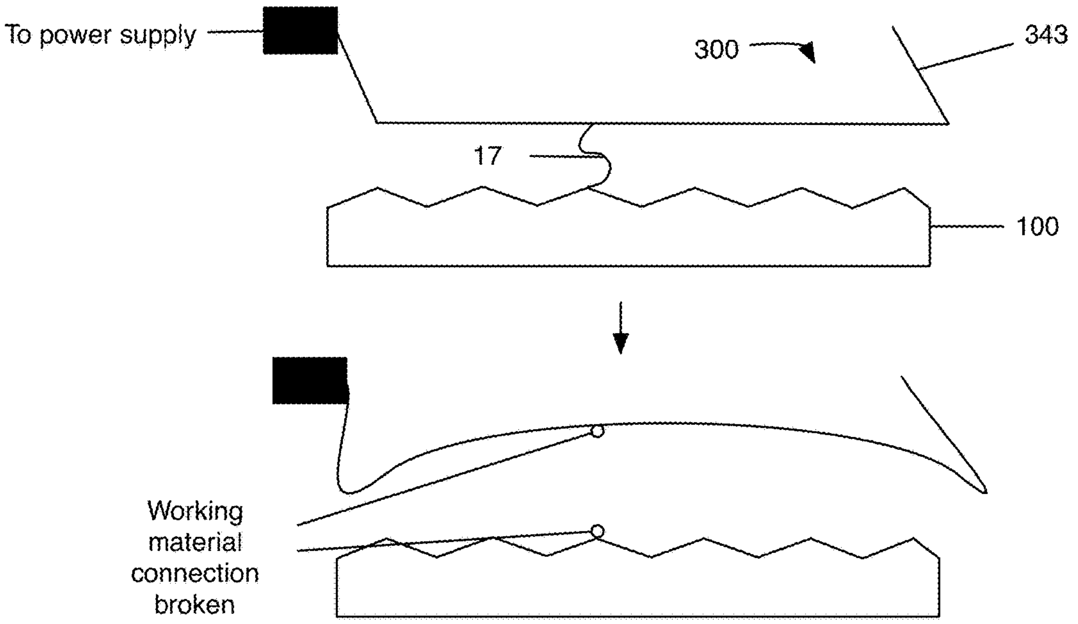
FIG. 13 is a schematic representation of an example of an electrode that includes memory metal, where the memory metal deforms when working material is incident upon the electrode (e.g., causing an electrical short, generating heat, etc.).

In a third specific example (as shown for instance in FIG. 13), an electrode can include a shape-memory alloy 343 (e.g., memory metal such as martensite/austenite, NiTinol, nickel/titanium alloys, silver/cadmium alloys, gold/cadmium alloys, copper/aluminum/nickel alloys, copper/tin alloys, copper/zinc alloys, indium/titanium alloys, nickel/aluminum alloys, iron/platinum alloys, manganese/copper alloys, etc.). The shape-memory alloy preferably exhibits a two-way memory effect (e.g., between a high temperature and a low temperature shape), but can exhibit a one-way memory effect, and/or any suitable effect. When a shorting event occurs, the memory metal can undergo a shape change such that the working material is no longer in contact with the electrode. After the shorting event is interrupted, the electrode can relax back to its initial configuration (e.g., shape, geometry, etc.).

The first, second, and/or third specific examples interruptible electrodes can be combined in any manner. For instance, a capillary can include a coating that can be etched away, a capillary can be made of a memory metal, a memory metal can include a coating that can be etched away, and/or the electrodes can be combined in any manner.

Figure 5:
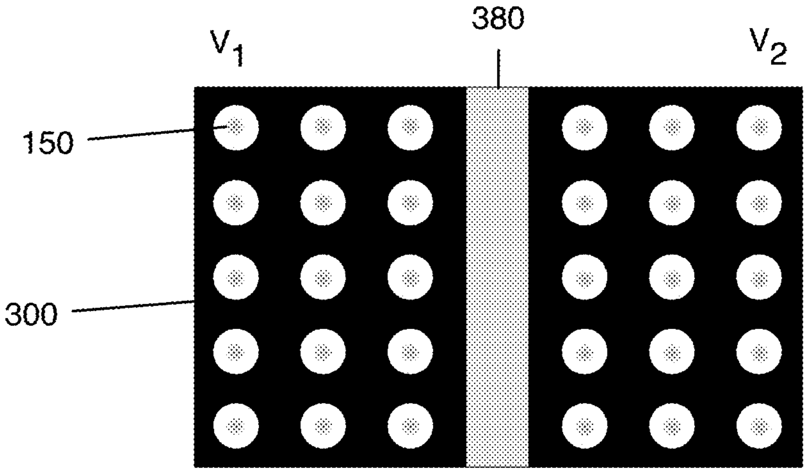
FIG. 5 is a schematic representation of a top-down view of an exemplary grid electrode that is separated into two regions, where the two regions can have independently controllable electric potentials.

An electrode can optionally be segmented (e.g., as shown for example in FIG. 5), which can function to electrically isolate different regions of the electrode (e.g., without mechanically isolating the electrode, with mechanical segment isolation). Segmenting the electrode can be beneficial to prevent failure from one emitter (e.g., shorting or contact between an emitter and the electrode) from causing failure of the full electrode (e.g., because different regions or segments are not in electrical communication), can be used to create an emission density gradient across the emitter array (e.g., by having a different electrical potential for each segment of the electrode), and/or can provide any suitable benefit(s). The electrode can be segmented, for instance, using a separator 380 (e.g., a dielectric interface) to separate the electrode. However, the electrode can be segmented in any manner. The electrode can be segmented into any number of segments between 1 and N, where N is the number of emitters of the emitter array. However, the electrode can be segmented in more than N ways. Each segment is preferably separately connected to the power supply (and/or reference potential) such as the segments are connected in parallel, but the segments can be connected in series. Each electrode of the plurality of electrodes can be segmented in the same or different manner.

Each segment can be connected to the power supply using the same balancing electronics, each segment can have separate balancing electronics, a subset of segments can be connected to the power supply via balancing electronics (e.g., where the remaining segments are connected to the power supply without using balancing electronics), different segments can be connected to different power supplies, and/or the segments can otherwise be connected to the power supply(s).

Each segment of the electrode can be operated at the same and/or different electrical potential. In an illustrative example, an electrode can be striped (e.g., include bars) with a predetermined number of segments (e.g., each grid can be a segment; a set of 2, 3, 4, 5, 10, 20, etc. grids can form a segment; quadrants; octants; orthants; sectors; etc.) with each segment having a lower electrical potential (e.g., 1 V, 2 V, 5V, 10 V, 20 V, etc.) lower than the previous segment such that across the emitter array the emission drops according to the current-voltage performance of the emitters. In variations of this illustrative example, the segments can have an electrical potential that is determined based on a thruster response, emitter response (e.g., a measured emitter response), a target thruster operation (e.g., a gradient to achieve a target operation), operation instructions (e.g., where instructions can be sent to the electrode to change, modify, update, etc. the electrical potential of each segment individually, in concert, etc.), based on shorting events (e.g., in other segments), based on a dynamic electrode geometry (e.g., gap distance varying with voltage), and/or can otherwise be determined.

In some embodiments, an electrode (e.g., an extractor electrode, a distal electrode, accelerator electrode working electrode, etc.) can include a thermal element (e.g., heating element, cooling element), which can function to modify a temperature of the electrode, the emitter array, working material, the frame, and/or any suitable material or structures. For example, the thermal element can be used to cause decomposition of the working material, accelerate working material degradation, cause a phase change in the working material (and/or electrode, coating, etc.), otherwise facilitate (e.g., initiate) a reaction in any accumulated working material or working material byproducts, change an emission (e.g., firing) operation (e.g., raising a temperature of working material to increase an emission current of working material, lowering a temperature of working material to decrease an emission current of working material, etc.), and/or can otherwise function. The thermal element could be the electrode itself and/or another component (e.g., a resistive heater, a radiative heater, a thermo-electric cooler, a heat sink, etc.). In some variants, the thermal energy can be provided by a radiant (and/or non-integrated) source (e.g., the sun, nuclear source, exothermic reaction, endothermic reaction, etc.), where the electrode can include (e.g., be made of, be coated with, etc.) a high-absorptivity (e.g., with an absorptivity that depends on the source, absorptivity greater than about 0.8, etc.) material. In related variants, coupling the thermal element with a material (e.g., a coating, a substrate, etc.) that is low-emissivity (e.g., thermal emissivity less than about 0.2) could enable less power to be used to reach a high temperature. However, any suitable thermal element(s) can be used.

In a variant of the thermal element, the thermal element can enable a temperature control between about-50 and 100° C. (e.g., −55-105° C., −50-0° C., −20-0° C., −10-0° C., −50-50° C., −20-70° C., 0-70° C., 0-100° C., 20-70° C., 20-100° C., values or ranges therebetween), or over a temperature range that extends below-50° C. or above 100° C. The temperature (or temperature range) can be associated with a linear, nearly-linear (e.g., regression fit greater than about 0.9), polynomial, and/or complex apparatus response.

In a specific example, instructions can be transmitted to modify a temperature of the apparatus or components thereof (e.g., the working material, electrodes, etc.) such as to modify an emission current of working material (e.g., in connection to and/or independent of modifying the emission current by changing an electric potential).

The apparatus can optionally include one or more secondary electrodes 360, which can function to mitigate (e.g., prevent, hinder, decrease) the exposure of a failed emitter and/or electrode to still working electrodes, to a space environment, and/or to any suitable environment. However, additionally or alternatively, the secondary electrode(s) can function to protect the apparatus (e.g., emitters, working material, electrode, etc.) from electrons or other charged particles (e.g., to protect the emitters from electrons or other charged particles such as protons, secondary ions, ion fragments, cosmic rays, etc. from interacting with the emitter surface), can function as an accelerator electrode(s), can function as a redundant electrode (e.g., in the event of failure, shorting events, etc. in the electrode), and/or can function in any manner. The secondary electrode can be supported by the frame, supported by an auxiliary structure, mounted to a spacecraft, and/or can otherwise be arranged and/or supported. The secondary electrode can be between the emitter array and the electrode and/or oppose the emitter array across the electrode. The secondary electrode can be offset from (e.g., above, distance between, etc.) the electrode by any amount between about 0-10 mm (e.g., 1 μm, 5 μm, 10 μm, 50 μm, 100 μm, 500 μm, 1 mm, 2 mm, 3 mm, 5 mm, 7 mm, 9 mm, 10 mm, 10.5 mm, values or ranges therebetween, etc.; in the same plane as, preferably but not exclusively when the thickness of the secondary electrode is greater than the electrode; etc.), but can have a separation larger than 10 mm. However, a secondary electrode can otherwise be arranged.

The secondary electrodes are preferably at approximately the same potential as the electrode (e.g., when the electrode acts as a ground plane, the secondary electrode can also act as a ground plane; within a threshold electrical potential of the primary electrode such as within 1 V, 5 V, 10V, 50V, 100 V, 500V, 1000 V, values or ranges therebetween, >1000 V, <1 V, etc.; etc.), but can be at a different potential.

A secondary electrode can be the same as the electrode (e.g., same structure), a halo electrode (e.g., have an aperture such that working material from all or a subset of emitters pass through the same aperture; have an aperture that surrounds the electrode, emitter array, etc.; etc.), and/or can have any suitable structure. A secondary electrode can have any suitable electrode structure (e.g., such as structures described above for electrodes) and/or any suitable structure and/or composition.

Figure 10:
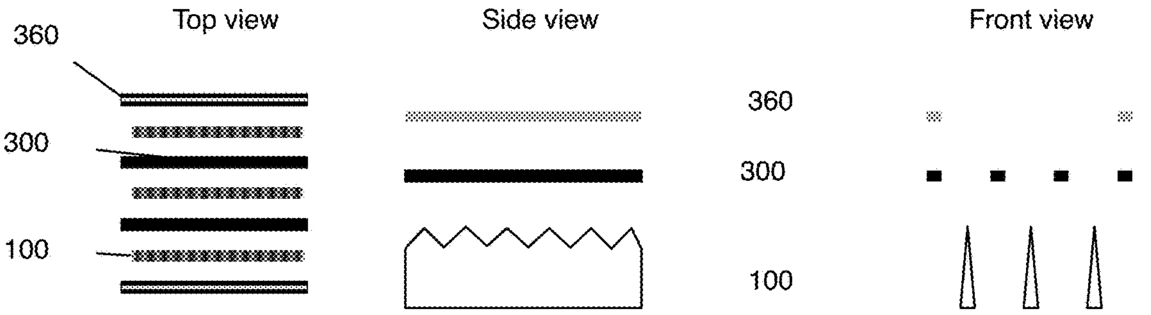
FIG. 10 is a schematic representation of an exemplary emitter, extractor electrode, and halo electrode from top, side, and front perspectives.

In some variants (e.g., when the electrode is a grid electrode), openings in the secondary electrode can be the same as in the electrode, can be larger than in the electrode (e.g., to decrease a risk of working material impinging on the secondary electrode), and/or can be smaller than in the electrode (e.g., to provide better protection, shielding, etc.). In a first specific example, a grid electrode can have a pair of bars that cooperatively define an opening associated with a given emitter (e.g., working material emitter from the emitter is intended to pass through the opening in the bars; such that a different pair of bars is associated with each emitter, emitter structure, etc.; etc.) and a secondary electrode can similarly have a pair of bars that cooperatively define an opening associated with the emitter. In variants of the first specific example, such as for electrodes that include a grid of holes that working material passes through, holes in the electrode can be the same size as holes in the secondary electrode (e.g., a hole in the electrode can be aligned to or associated with an emitter and the holes in the secondary emitter can be associated the same emitter or emission structure). In a second specific example (as shown for example in FIG. 10), a grid electrode can have a pair of bars that cooperatively define an opening associated with a given emitter (e.g., working material emitter from the emitter is intended to pass through the opening in the bars; such that a different pair of bars is associated with each emitter, emitter structure, etc.; etc.) and a secondary electrode can similarly have a pair of bars that cooperatively define an opening associated with a plurality of emitters (e.g., 2 emitters, 3 emitters, 4 emitters, 10 emitters, 20 emitters, 40 emitters, 100 emitters, 200 emitters, 400 emitters, 1000 emitters, values or ranges therebetween, >1000 emitters, an entire emitter array, etc.). In variants of the second specific example, such as for electrodes that include a grid of holes that working material passes through, holes in the electrode can be smaller than holes in the secondary electrode (e.g., a hole in the electrode can be aligned to or associated with an emitter while the holes in the secondary emitter are associated with more than one emitter or emission structure). However, the secondary electrode can otherwise be arranged.

In some variants, in addition or alternative to the secondary electrodes, conductive shielding can be provided between emitter arrays and/or between electrodes.

In some embodiments, a frame and/or an electrode can include (e.g., be made from) a substrate 220, 320 that is coated with a coating material 240, 340 (e.g., a coating material can be deposited on, disposed on, grown on, in contact with, supported by, etc. a substrate). However, the substrate can be bare (e.g., not include a coating). The substrate can function to provide mechanical support, electrical stability, and/or otherwise stabilize the electrode and/or frame and/or otherwise function. The substrate is preferably dielectric, but can be conductive, semiconducting, and/or have any suitable electrical properties. Examples of substrate materials include: ceramics (e.g., alumina, titania, yttria, etc.), glasses, composites (e.g., including a matrix such as an epoxy resin; a reinforcement such as woven glass fibers, nonwoven glass fibers, paper, etc.; filler such as ceramics, titanate ceramics; etc.), laminates (e.g., polytetrafluoroethylene, FR-1, FR-2, FR-3, FR-4, FR-5, FR-6, CEM-1, CEM-2, CEM-3, CEM-2, CEM-4, CEM-5, G-10, RF-35, etc.), metals (e.g., aluminum, copper, etc.), insulated metal substrate, polymers (e.g., polyimide, polytetrafluoroethylene, ceramic-filled polytetrafluoroethylene, etc.), and/or any suitable material(s). The substrate is preferably resilient to reactive species (e.g., atomic oxygen, plasma, atomic hydrogen, solar particles, etc.), but can have any suitable chemical compatibility to reactive species. The substrate thickness can be between about 10 μm and 10 mm, less than 10 μm thick, and/or greater than 10 mm thick. In a specific example, the substrate size (e.g., width, thickness, etc.) can be between about 50-500 μm, which can be beneficial for conferring sufficient mechanical stiffness while mitigating a risk of working material impinging upon the electrode.

Figure 3:
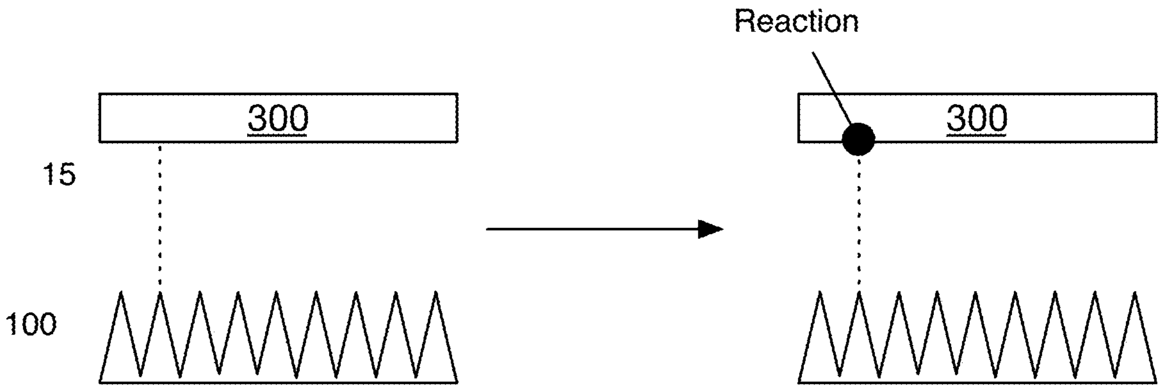
FIG. 3 is a schematic representation of an exemplary embodiment of an electrospray emission electrode.

The coating can function to protect, stabilize, confer a property (e.g., electrical conductivity, stiffness, chemical resistance, physical resistance, adhesion, electrical properties, multifunctionality, behavior change with material removal, etc.), and/or can otherwise function. The electrode and/or frame can include a dielectric coating (e.g., a passivating coating), a reactive coating (e.g., a degradable coating, a coating that undergoes an electrochemical reaction with working material at a threshold electrical potential, where the reaction byproduct can be dielectric or otherwise limit or stop electrical shorting between working material and the electrode as shown for example in FIG. 3; a material that undergoes a spontaneous reaction with working material; a material that catalyzes a reaction with the working material such as to degrade the working material; etc.), an electrically conductive material, and/or any suitable coating. The coating thickness can be between about 10 nm and 1 mm (e.g., 10 nm, 20 nm, 50 nm, 100 nm, 200 nm, 500 nm, 1 μm, 2 μm, 5 μm, 10 μm, 20 μm, 50 μm, 100 μm, 200 μm, 500 μm, 1 mm, values or ranges therebetween, etc.), can be less than 10 nm, and/or greater than 1 mm.

Figure 7:
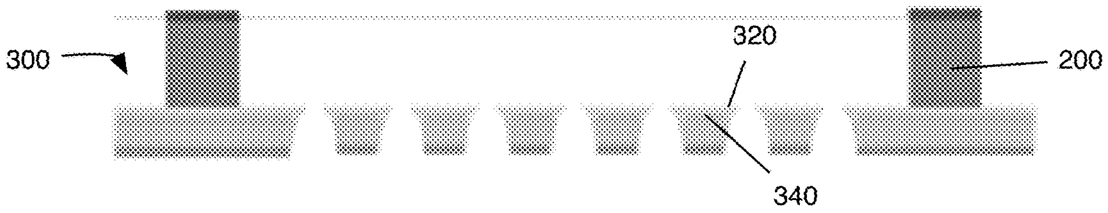
FIG. 7 is a schematic representation of an example of an extractor electrode.

The coating can cover surfaces (e.g., of the electrode, of the frame, etc.) facing (e.g., directed toward, with a broad face in view of, proximal, as shown in FIG. 2B, etc.) the emitter array, all surfaces (e.g., of the electrode, of the frame, etc. shown for example in FIG. 7), surfaces (e.g., of the electrode, of the frame) that can contact working material (e.g., directly such as primary emission, indirectly such as via ion return, as shown for example in FIG. 2A or FIG. 2C, etc.), surfaces (e.g., of the electrode, of the frame, etc.) that cannot contact emitted working material (e.g., to protect the electrode from secondary electrons, to modify a local electric field, to protect the electrode from return ions, etc.), and/or any suitable surface(s) (e.g., of the frame and/or electrode) can be coated. For example, as shown in FIG. 2A, the frame can include a dielectric coating on all sides or surfaces of the frame that can contact (incidentally or intentionally) working material exiting the emitter array.

A substrate can include a plurality of coatings. Each coating can be the same (e.g., materials, type, thickness, etc.) or different (e.g., materials, type, thickness, etc.). For instance, an electrode can be made of a substrate (e.g., a dielectric substrate) that includes an electrically conductive coating, where the electrically conductive coating can be protected with a dielectric coating. However, any suitable number and/or types of coating can be used.

The coating (e.g., coating materials) preferably has a low yield (e.g., less than about 1%, 2%, 5%, 10%, 20%, etc.) of secondary electron emission or backscatter electron emission, but can have any suitable yield of secondary electron emission or backscattered electron emission.

In variants that use a dielectric coating, the coating is preferably not too thick (e.g., can have a thickness that is between about 50-500 μm, thickness <about 500 μm, etc.) as thick dielectric coatings can build up charge and lead to a screening of the working material from the target electric field. However, thick dielectric coatings can be used to tune a local electric field (e.g., for individual emitters, for clusters of emitters, etc.; configured to limit or hinder further impingement of working material on an electrode; etc.), dielectric charging can be mitigated (e.g., using a charge extractor), and/or can otherwise be used. Examples of dielectric coating materials include: silicon oxides (e.g., $SiO_x$), silicon nitride (e.g., $SiN_x$), silicon oxynitrides (e.g., $SiO_xN_y$), polymers (e.g., polyether ether ketone (PEEK), polyimide, polytetrafluoroethylene, ceramic-filled polytetrafluoroethylene, etc.), resin (e.g., glass-reinforced UV-cured resin, UV-cured resin, etc.), ceramics (e.g., metal ceramics, aluminum oxide, yttrium oxide, titanium oxide, zinc oxide, zirconium oxide, hafnium oxide, tungsten oxide, barium titanate, silicon aluminum oxynitride, silicon carbide, magnesium silicate, titanium carbide, uranium oxide, yttrium barium copper oxide, etc.), and/or any suitable coating material can be used. A breakdown voltage of the dielectric (e.g., dielectric coating, dielectric baffle, dielectric frame, substrate, etc.) is preferably at least 2 kV. However, the dielectric breakdown voltage can be less than 2 kV. The breakdown voltage can depend on a thickness of the coating, a uniformity of the coating, a surface roughness of the coating, a coating material, an impurity of the coating (e.g., impurity concentration, impurity identity, etc.), and/or can depend on any suitable property of the coating.

The optional power supply 500 preferably functions to generate one or more electric signals (e.g., electric potentials, current, etc.). The electric signal(s) are preferably direct current (DC), but can additionally or alternatively be alternating current (AC) (e.g., where a frequency can depend on an operation of the apparatus, can be fixed, etc.; low frequency; etc.), pulsating current, variable current, transient currents, and/or any current. The power supply can be in electrical communication with the emitter array, the substrate, the working material, the reservoir, the distal electrode, the counter electrode, an external system (e.g., satellite such as small satellites, microsatellites, nanosatellites, picosatellites, femto satellites, CubeSats, spacecraft, etc.), an electrical reference (e.g., an electrical ground), and/or any suitable component. The power supply preferably generates large electric potentials such as at least 500 V, 1 k V, 1.5 kV, 2 kV, 3 kV, 4 kV, 5 kV, 10 kV, 20 kV, 50 kV. However, the power supply can generate electric potentials less than 500 V and/or any suitable electric potential. The electric potentials can depend on the working material, the emitter material, emitter separation distance, emitter geometry, emitter parameters, emitter array properties, emitter-electrode separation distance, and/or any suitable properties. The power supply is preferably able to output either polarity electric potential (e.g., positive polarity, negative polarity), but can output a single polarity. For example, the power supply can simultaneously (e.g., concurrently), contemporaneously (e.g., within a predetermined time such as 1 ns, 10 ns, 100 ns, 1 μs, 10 μs, 100 μs, 1 ms, 10 ms, 100 ms, 1 s, 10 s, 1 ns-10 μs, 1 μs-100 μs, 100 μs-10 ms, 1 ms-1 s, etc.), serially, or otherwise output a first (polarity) electric potential (e.g., to working material associated with a first subset of emitters, to working material associated with a first subset of emitter arrays, to a first distal electrode, to a first reservoir, etc.) and a second (polarity) electric potential (e.g., to working material associated with a second subset of emitters, to working material associated with a second subset of emitter arrays, to a second distal electrode, to a second reservoir, etc.). However, the power supply can switch polarity, the apparatus can include more than one power supply (e.g., one power supply associated with each emitter array, two or more power supplies associated with each emitter array, one power supply associated with each subset of emitter arrays, etc.) and/or the power supply(s) can be otherwise arranged.

In a specific example, the power supply can be the same as any power supply as described in U.S. patent application Ser. No. 17/066,429 titled "SYSTEM AND METHOD FOR POWER CONVERSION" filed 8 Oct. 2020, which is incorporated herein in its entirety by this reference. However, any power supply can be used.

Figure 14:
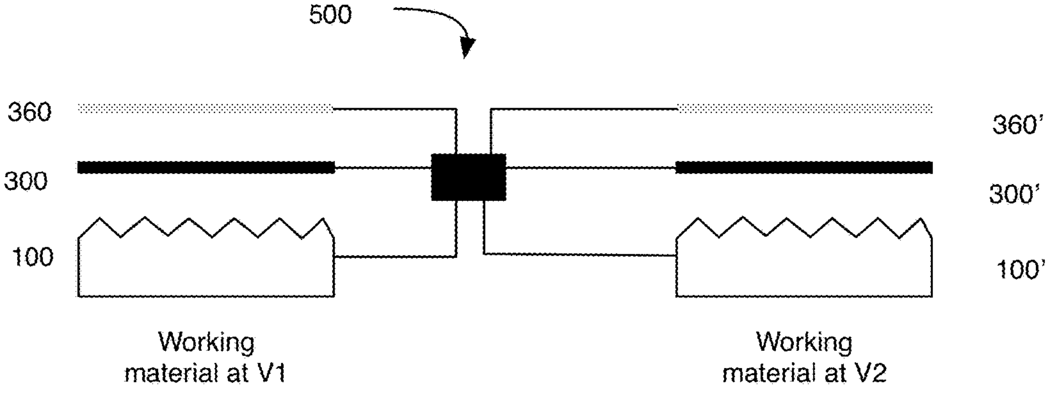
FIG. 14 is a schematic representation of an example of a plurality of emitter arrays, each associated with an extractor electrode and an optional halo electrode, where working material expelled from a first emitter array experiences a different electrical potential (e.g., approximately the same magnitude but opposite sign) as working material expelled from a second emitter array.

In an illustrative example (as shown for example in FIG. 14), a first set of emitters (or emitter arrays 100 and associated electrode 300, optional secondary electrode 360, etc.) can be coupled to working material maintained at a first electric potential V1 (e.g., a first electric polarity) and a second set of emitters (or emitter arrays 100' and associated electrode 300', optional secondary electrode 360', etc.) can be coupled to working material maintained at a second electric potential V2 (e.g., a second electric polarity; such as approximately the same in magnitude but opposite in electric polarity to the first electric potential). In this example, the first and second electric polarity can be changed (e.g., switched such as after a predetermined time, responsive to a measured signal, etc.) and/or can be fixed (e.g., static).

The apparatus can optionally include a control system (e.g., computing system, processor, microprocessor, sensor, etc.) which can control the apparatus operation (e.g., based on instructions received from an operator such as a terrestrial operator, based on a feedback, based on measured electrical signal(s) such as extractor current, based on predetermined operations, etc.).

The apparatus (particularly, but not exclusively, the frame and/or electrodes) can be made (e.g., manufactured, coated, shaped, etc.) using patterning (e.g., photolithography, shadow masking, etc.), deposition (e.g., growth; chemical vapor deposition (CVD) such as atmospheric pressure CVD, low pressure CVD, plasma enhanced CVD, etc.; physical vapor deposition (PVD) such as sputtering, evaporative deposition, electron beam PVD, etc.; epitaxy; etc.), etching (e.g., dry etching, plasma etching, reactive-ion etching, deep reactive ion etching, wet etching, chemical etching, etc.), forming (e.g., microextrusion, microstamping, microcutting, etc.), laser-based techniques (e.g., laser direct-writing, microstereolithiography, multiphoton lithography, laser CVD, laser-induced forward transfer, laser ablation, etc.), 3D printing (e.g., fused filament fabrication), and/or using any suitable techniques.

Embodiments of the apparatus and/or method can include every combination and permutation of the various apparatus components and the various method processes, wherein one or more instances of the method and/or processes described herein can be performed asynchronously (e.g., sequentially), concurrently (e.g., in parallel), or in any other suitable order by and/or using one or more instances of the apparatuses, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. An electrospray emitter comprising:

an emitter structure connected to a reservoir containing a working material, wherein the working material is in electrical communication with a first electrode; and a grid electrode separated from a tip of the emitter structure by a distance between about 0 micrometers and about 50 micrometers, wherein a surface of the grid electrode proximal the emitter structure comprises a degradable coating that undergoes an electrochemical reaction with the working material when an electrical current exceeds a threshold current;

wherein a surface of the grid electrode distal the emitter structure does not comprise the degradable coating.

2. The electrospray emitter of claim 1, wherein the grid electrode comprises the degradable coating, wherein the degradable coating comprises chromium.

3. The electrospray emitter of claim 1, wherein a separation between the emitter structure and the grid electrode is maintained by a dielectric frame.

4. The electrospray emitter of claim 1, wherein the emitter structure is a first emitter structure, further comprising:

a second emitter structure connected to the reservoir; and a second grid electrode separated from a tip of the second emitter structure by a distance between about 0 micrometers and about 50 micrometers;

wherein working material emitted from the first emitter structure experiences a first electrical polarity and wherein working material emitted from the second emitter structure experiences a second electrical polarity.

5. The electrospray emitter of claim 1, further comprising a secondary electrode configured to shield the emitter structure from electrons or other ions, wherein the grid electrode is arranged between the emitter structure and the secondary electrode.

6. The electrospray emitter of claim 5, wherein an electric potential of the secondary electrode differs from an electric potential of the grid electrode by at most 500 V.

7. The electrospray emitter of claim 5, wherein a spacing between grids of the grid electrode is smaller than a spacing between grids of the secondary electrode.

8. The electrospray emitter of claim 1, wherein a high impedance resistor is in an electrical path between the grid electrode and a power supply.

9. An electrospray emitter comprising:

an emitter structure connected to a reservoir containing a working material, wherein the working material is in electrical communication with a first electrode; and a grid electrode separated from a tip of the emitter structure by a distance between about 0 micrometers and about 50 micrometers, wherein a surface of the grid electrode proximal the emitter structure comprises a dielectric material, wherein a surface of the grid electrode distal the emitter structure does not comprise the dielectric material; and a secondary electrode configured to shield the emitter structure from electrons or other ions, wherein the grid electrode is arranged between the emitter structure and the secondary electrode;

wherein a spacing between grids of the grid electrode is smaller than a spacing between grids of the secondary electrode.

10. The electrospray emitter of claim 9, wherein the grid electrode comprises the dielectric material, wherein the dielectric material comprises silicon oxide, silicon nitride, silicon oxynitride, polyether ether ketone, glass-reinforced UV-cured resin, aluminum oxide, yttrium oxide, titanium oxide, or combinations thereof.

11. The electrospray emitter of claim 9, wherein a separation between the emitter structure and the grid electrode is maintained by a dielectric frame.

12. The electrospray emitter of claim 9 wherein the emitter structure is a first emitter structure, further comprising:

a second emitter structure connected to the reservoir; and a second grid electrode separated from a tip of the second emitter structure by a distance between about 0 micrometers and about 50 micrometers;

wherein working material emitted from the first emitter structure experiences a first electrical polarity and wherein working material emitted from the second emitter structure experiences a second electrical polarity.

13. The electrospray emitter of claim 9, wherein an electric potential of the secondary electrode differs from an electric potential of the grid electrode by at most 500 V.

14. The electrospray emitter of claim 9, wherein a high impedance resistor is in an electrical path between the grid electrode and a power supply.

* * * * *